US009886055B2

United States Patent
Jung et al.

(10) Patent No.: US 9,886,055 B2
(45) Date of Patent: Feb. 6, 2018

(54) MEMORY INITIALIZING METHOD AND ELECTRONIC DEVICE SUPPORTING THE SAME

(71) Applicant: Samsung Electronics Co., Ltd., Gyeonggi-do (KR)

(72) Inventors: Won Suk Jung, Gyeongsangbuk-do (KR); Jae Hoon Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 146 days.

(21) Appl. No.: 14/623,942

(22) Filed: Feb. 17, 2015

(65) Prior Publication Data
US 2015/0234421 A1 Aug. 20, 2015

(30) Foreign Application Priority Data

Feb. 19, 2014 (KR) .................. 10-2014-0018882

(51) Int. Cl.
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
CPC .................................. G06F 1/08; G06F 1/12
See application file for complete search history.

(56) References Cited

U.S. PATENT DOCUMENTS

| 6,530,001 | B1 | 3/2003 | Lee |
| 8,010,709 | B2 | 8/2011 | Pyeon et al. |
| 8,589,717 | B1* | 11/2013 | Davis .................. G06F 1/04 713/500 |
| 8,626,958 | B2 | 1/2014 | Pyeon et al. |
| 8,665,665 | B2 | 3/2014 | Huang |
| 8,976,620 | B2 | 3/2015 | Huang |
| 9,176,908 | B2 | 11/2015 | Shaeffer |
| 2003/0026162 | A1 | 2/2003 | Matsui |
| 2004/0095308 | A1* | 5/2004 | Kim .................... G09G 3/3648 345/99 |
| 2006/0218331 | A1 | 9/2006 | James |
| 2008/0140948 | A1* | 6/2008 | Pyeon .................. G11C 16/20 711/154 |
| 2010/0169699 | A1* | 7/2010 | Fujimoto ............ G06F 13/4291 713/503 |
| 2011/0185086 | A1 | 7/2011 | Pyeon et al. |

(Continued)

OTHER PUBLICATIONS

European Search Report dated May 29, 2017.

*Primary Examiner* — Thomas Lee
*Assistant Examiner* — Chad Erdman
(74) *Attorney, Agent, or Firm* — Cha & Reiter, LLC

(57) ABSTRACT

An electronic device and method in which a tuning process is performed during memory initialization, so as to reduce the occurrence of data read errors. The device may include a clock generator that generates a clock signal transmitted to a memory device, and a host control module that transmits to the memory device a change signal changing at least a portion of the clock signal, and/or a tuning related command. The host control module may receive setting data from the memory device, corresponding to at least one of the change signal and the tuning related command.

12 Claims, 13 Drawing Sheets

(56) References Cited

U.S. PATENT DOCUMENTS

| | | |
|---|---|---|
| 2012/0049919 A1 | 3/2012 | Fujii et al. |
| 2012/0054531 A1 | 3/2012 | Murayama |
| 2012/0063524 A1 | 3/2012 | Stott et al. |
| 2012/0250426 A1* | 10/2012 | Huang ................. G11C 7/1066 365/189.07 |
| 2012/0311371 A1* | 12/2012 | Shaeffer .............. G06F 13/1694 713/501 |
| 2013/0276130 A1 | 10/2013 | Chen et al. |
| 2014/0032815 A1* | 1/2014 | Mangalindan ...... G06F 13/4243 711/103 |
| 2014/0133248 A1 | 5/2014 | Huang |
| 2016/0019171 A1 | 1/2016 | Shaeffer |

* cited by examiner

MEMORY INITIALIZING METHOD AND ELECTRONIC DEVICE SUPPORTING THE SAME

CLAIM OF PRIORITY

This application claims priority under 35 U.S.C. §119 to Korean patent application No. 10-2014-0018882 filed Feb. 19, 2014, the disclosure of which is hereby incorporated in its entirety by reference.

BACKGROUND

1. Technical Field

The present disclosure relates generally to memory initialization.

2. Description of the Related Art

With recent advances in digital technology, a variety of portable electronic devices designed for communication and personal information processing have become widely available, for example, mobile communication terminals, personal digital assistants (PDAs), electronic organizers, smartphones, and tablet personal computers (PCs). Such electronic devices have evolved from their typical original areas to multi-function devices. Of course, today's electronic devices include memories for data storage.

The above-mentioned conventional electronic devices may recognize a memory mounting status and may perform an initialization process relating to memory usage. During this process, the conventional electronic devices may determine a data sampling point of memory. However, since a data sampling point of memory is occasionally calculated incorrectly, errors occur during use of memory.

SUMMARY

Various embodiments of the disclosure relate to providing a memory initializing method for minimizing or reducing errors during memory recognition by performing a more robust memory initializing process, and an electronic device supporting the same.

Various embodiments of the disclosure are related to providing a memory initializing method for appropriate memory recognition and management according to an electronic device situation or user selection by selectively managing various methods relating to sampling point determination, and an electronic device for the same.

Various embodiments relate to providing a memory initializing method for minimizing memory usage errors during temperature change or output change by detecting and applying a more robust sampling point and an electronic device supporting the same.

According to an embodiment, an electronic device includes: a clock generator configured to generate a clock signal transmitted to a memory device; and a host control module configured to transmit to the memory device at least one of a change signal changing at least a portion of the clock signal, and a tuning related command, and to receive setting data from the memory device, which is received corresponding to at least one of the change signal and the tuning related command.

According to an embodiment of the present invention, a memory initializing method includes: transmitting to a memory device a change signal changing at least a portion of a clock signal or a tuning related command; and receiving setting data corresponding to the change signal or the tuning related command from the memory device.

DETAILED DESCRIPTION

Figure 1:
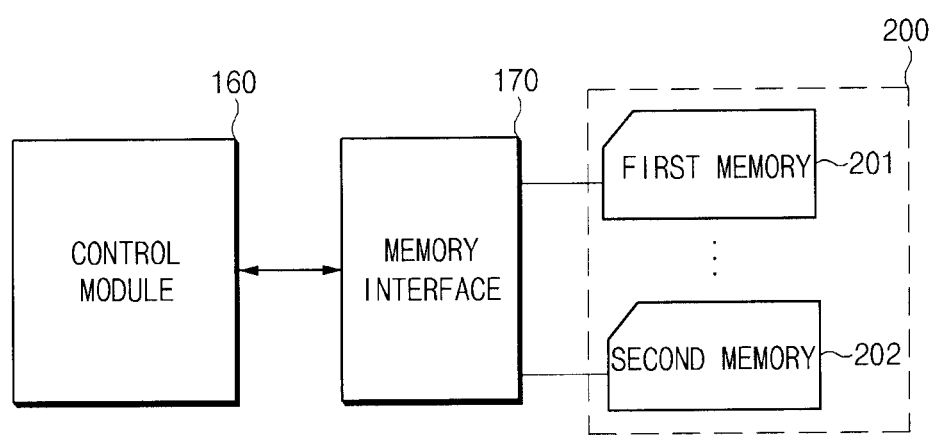
FIG. 1 is a block diagram illustrating an electronic device according to an embodiment.

Hereinafter, various embodiments are described with reference to the accompanying drawings. Various modifications are possible in various embodiments of the present disclosure and specific embodiments are illustrated in drawings and related detailed descriptions are listed. Thus, it is intended that the present invention covers the modifications and variations of this disclosure provided they come within the scope of the appended claims and their equivalents. With respect to the descriptions of the drawings, like reference numerals refer to like elements.

Hereinafter, an electronic device according to various embodiments of the present disclosure will be described in more detail with reference to the accompanying drawings. The term "user" in various embodiments may refer to a person using an electronic device or a device using an electronic device (for example, an artificial intelligent electronic device).

FIG. 1 is a block diagram schematically illustrating an electronic device according to an embodiment. Electronic device 100 may include a control module 160, a memory interface 170, and a memory device 200. In device 100, when the memory device 200 is connected to the memory interface 170 (for example, inserted or placed in near field proximity for contactless data communication), in response to the reception of a specific event, the control module 160 may perform an initialization process of the memory device 200. According to an embodiment, the initialization process relates to a sampling point of the memory device 200. As will be explained in detail later, during this process, the electronic device 100 may perform a tuning process for detecting a sampling point by using a change signal. Here, a method of using a change signal may include at least one of a method of using a delay clock, a method of using a memory type change, and a method of using a clock change. The electronic device 100 may obtain information relating to a sampling point tuning of the memory device 200 through the method of using the change signal. The electronic device 100 may perform more accurate sampling point detection and management on the basis of the tuning related information.

The memory device 200 may be connected to the control module 160 through the memory interface 170. The memory device 200 may include at least one memory 201 and/or 202. For example, the memory 200 may include a first memory 201 in an external memory form and a second memory 202 in an internal memory or embedded memory form. The first memory 201 may be detachably coupled to the memory interface 170. Accordingly, in correspondence to user manipulation, the first memory 201 may be inserted into the memory interface 170 to be connected to the control module 160 or may be removed from the memory interface 170 to be released from the control module 160. The memory device 200 may be a Secure Digital (SD) memory card (for example, UHS memory card) or a micro SD memory card.

The memory interface 170 may be provided in plural parts when the memory device 200 includes a plurality of memories 201 and 202. The memory interface 170 may support an electrical connection between the control module 160 and the memory device 200. The memory interface 170 may include a power line for supplying power, a communication line for communication of the memory device 200, a control line routing device control signals of the memory device 200, and a clock line supplying a clock for data exchange with memory device 200. One end of each line of the memory interface 170 may be connected to an electrode terminal of memory device 200 and the other end may be connected to the control module 160.

The control module 160 performs an initialization process of the memory device 200 mounted at the memory interface 170 and controls the management of the initialized memory device 200 in correspondence to various event occurrences. According to an embodiment, when the first memory 201 is inserted into the memory interface 170, the control module 160 may perform the initialization process of the first memory 201. The memory Interface 170 may include a detection circuit for detecting an insertion state of the first memory 201 and when the first memory 201 is inserted, may deliver the information thereon to the control module 160. For example, the memory interface 170 may include a pull-up voltage circuit for the insertion detection of the first memory 201. The control module 160 may perform an initialization process and control sampling point detection and management in correspondence to the insertion of the first memory 201.

According to various embodiments, while the first memory 201 or the second memory 202 is inserted into the memory interface 170, if rebooting performance is requested, the control module 160 may perform the initialization process of the first memory 201 or the second memory 202 during a rebooting process. During this process, the control module 160 may control sampling point detection and management of the first memory 201 or the second memory 202.

According to various embodiments, as the electronic device 100 shifts into a sleep state, e.g. due to schedule information or a sleep command, at least one of the first memory 201 and the second memory 202 may be cut off from power supply. Then, if a sleep state is released and becomes a wakeup state, at least one of the first memory 201 and the second memory 202 may start to receive power. In this case, the control module 160 may perform the initialization process of a memory where power supply is interrupted and then resumed. During this memory initialization process, control module 160 may control sampling point detection and management.

Figure 2:
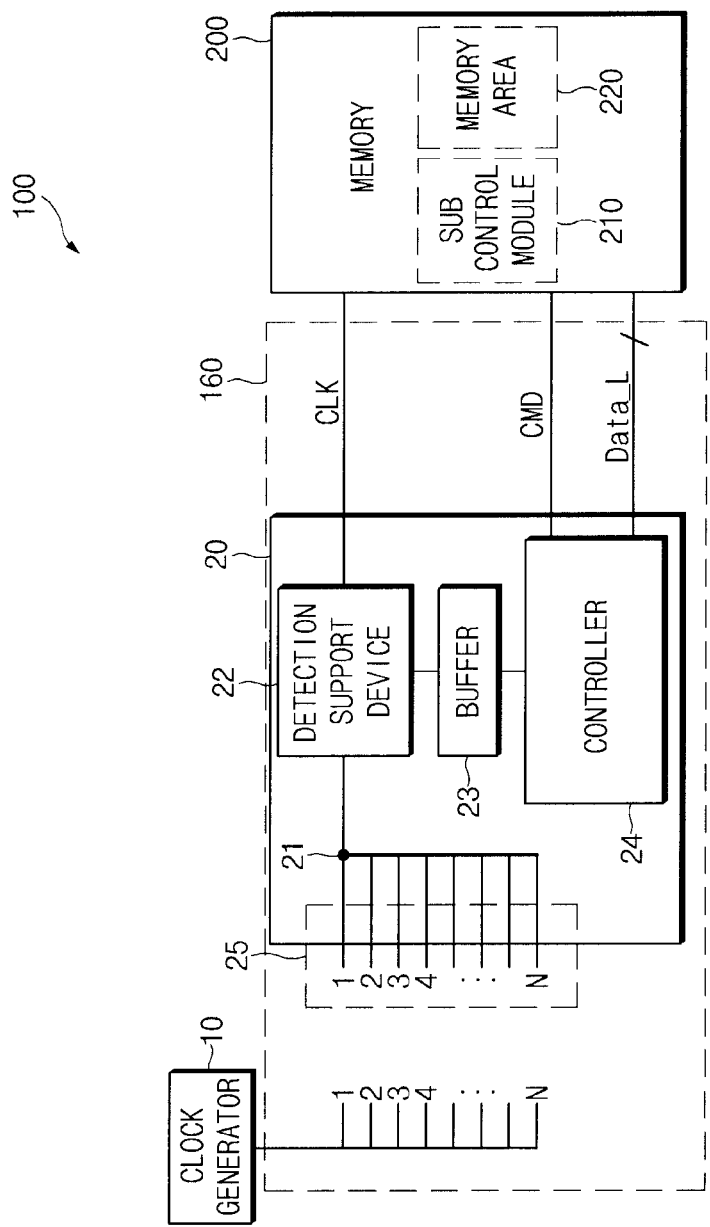
FIG. 2 is a block diagram schematically illustrating a configuration of a control module and a memory device according to various embodiments.

FIG. 2 is a block diagram schematically illustrating a configuration of a control module and a memory device according to various embodiments. Control module 160 may include a clock generator 10(for example, PLL(phase locked loop)) and a host control module 20. The memory device 200 may be connected to the host control module 20 through a plurality of signal lines CLK, CMD, and Data_L. Here, the memory device 200 may include at least one of the first memory 201 and the second memory 202 described with reference to FIG. 1.

The clock generator 10 may generate a clock (interchangeably, "clock signal") for management of the control module 160. The clock signal may be of a constant frequency in accordance with the manufacturing standards of the control module 160. The clock signal may be provided to the host control module 20. During this process, the clock generator 10 may supply clock signals to the host control module 20 sequentially. For example, the clock generator 10 may provide a generated clock to clock input terminals 25 of the host control module 20. Output terminals of clock generator 10 may be connected to respective input terminals of the clock input terminals 25. After sequentially outputting clocks from the first output terminal to the Nth output terminal, the clock generator 10 may output a constant clock from the first output terminal again. The clock generator 10 may generate clocks in various frequency bands according to a control of the control module 160.

The host control module 20 may supply both the clock signals delivered from the clock generator 10, and predefined initialization commands, to the memory device 200. While receiving data from the memory device 200 in correspondence with the delivered clock and initialization commands, the host control module 20 may perform the initialization process of the memory device 200. When this initialization process is completed, the host control module 20 may read data stored in the memory area 220 of the memory device 200 or may write specific data to the memory area 220. The host control module 20 may also include a clock selection terminal 21, a detection support device 22, a buffer 23, and a controller 24 to support the initialization of the memory device 200. Host control module 20 may further include an additional circuit line(s) and circuit device(s) in relation to the management of the memory device 200. For example, the host control module 20 may further include device components relating to the read and write operations of the memory area 220 and device components relating to the power supply of the memory device 200.

As noted, each input terminal of the clock input terminals 25 may be connected to an individual output terminal of the clock generator 10. Each clock delivered from the clock generator 10 may be provided to the detection support device 22. During this process, the clock input terminals 25 may deliver a clock of a specific input terminal to the memory device 200 through the detection support device 22 in correspondence with an operation of the clock selection terminal 21.

The clock selection terminal 21 may select one from a plurality of inputs terminals of clock input terminals 25 according to a control of the controller 24 and may deliver a clock of a corresponding input terminal to the detection support device 22. For example, the clock selection terminal 21 delivers the clock delivered to the first input terminal to the detection support device 22 in response to a control of the controller 24 and may then deliver the clock delivered to the second input terminal to the detection support device 22. Thereafter, the clock selection terminal 21 may deliver a clock delivered to each input terminal to the memory device 200 through the detection support device 22 by sequentially selecting the third input terminal to the Nth input terminal. After the clock at the Nth input terminal is delivered, the sequential selection from the first input terminal after the Nth input terminal may be repeated.

The detection support device 22 may be disposed between the clock selection terminal 21 and the memory device 200, and function to change a clock signal supplied to the memory device 200 or deliver the clock signal to the memory device 200 without a change. According to an embodiment, the detection support device 22 may include a bypass signal line for delivering a clock signal to the memory device 200 without changing the clock signal. According to an embodiment, the detection support device 22 may include at least one of a delay device and a clock control device.

The delay device may be a device for delaying a clock delivered through the clock selection terminal 21. For example, the delay device may be at least one of a resistance device, a capacitor device, and an inductor device. According to an embodiment, the delay device may include at least one inverter device. According to an embodiment, in relation to the delay device, a connection state of a plurality of inverter devices or a plurality of resistance devices is adjusted according to a setting value written in the buffer 23 (e.g., a register) so that an impedance value may be changed. According to an embodiment, if the delay device is embodied as a variable resistance device, an impedance value may be changed according to a setting value written in the buffer 23. A clock delivered through the delay device to the memory device 200 may be delivered at a given time delayed relative to a clock outputted from the clock generator 10.

The clock control device of support device 22 may be a device for changing the waveform of a clock delivered through the clock selection terminal 21. At least one of the amplitude, period or slope of a clock waveform may be changed thereby. Thus, for example, the clock delivered through the clock control device may be delivered to the memory device 200 with a different slope from that outputted from the clock generator 10.

The buffer 23 may store an impedance setting value of the delay device of detection support device 22 according to a control of the controller 24. When a specific impedance setting value is written in the buffer 23, the host control module 20 may change an impedance of the detection support device 22 into a corresponding setting value. According to an embodiment, a first impedance setting value and a second impedance setting value may be written in the buffer 23 at a given time. For example, the buffer 23 may provide the first impedance setting value to the detection support device 22 during a first clock period, and provide it with the second impedance setting value during another clock period. Here, the first impedance setting value may be a bypass setting value that causes essentially zero clock signal delay. According to various embodiments, when a sampling point detection process is performed, a specific impedance setting value may be written in the buffer 23. Once the sampling point detection process is completed, the buffer 23 may have a value restored to its original value or an unset state.

The buffer 23 may further store a power setting value of a clock control device of detection support device 22. This power setting value may include a value for changing at least one of the amplitude and period of a clock. Detection support device 22 may have a device state corresponding to the power setting value provided thereto from buffer 23.

The controller 24 writes the impedance setting value or the power setting value in the buffer 23 so that the detection support device 22 may change a specific clock. According to an embodiment, the controller 24 may perform an operation of writing a specific setting value in the buffer 23 and an operation of changing a specific impedance setting value to an original value according to various settings relating to a sampling point detection process. According to an embodiment, the controller 24 may write the power setting value in the buffer 23 and change the written power setting value to an original value according to various settings of a sampling point detection process. According to various embodiments, the controller 24 may perform a power setting value writing operation after an impedance setting value writing operation sequentially or may perform an impedance setting value writing operation after a power setting value writing operation based on various settings.

The controller 24 may transmit a specific command to the memory device 200 through a command signal line CMD. According to an embodiment, the controller 24 may deliver various commands relating to initialization to the memory device 200. According to an embodiment, the controller 24 may provide specific memory type information to the memory device 200. For example, if four memory types A, B, C, and D are available, controller 24 may provide information regarding one of these types to the memory device 200. In an embodiment of the present disclosure, an optimum sampling point detection process is performed to ascertain whether one type of standard should be used over another. Once a sampling point detection process is completed, the controller 24 may deliver defined type information, for example, the type B information, to the memory device 200. According to an embodiment, if the standard of memory device 200 may be the type B information (or the type A information), the controller 24 may deliver specific type information(e.g., A, C or D) to the memory device 200 in order to a test to change its type for an optimum sampling point. Therefore, after delivering the type C information to the memory device 200, if a sampling point detection process is completed, the controller 24 may deliver the defined type B information.

The controller 24 may receive a specific data signal from the memory device 200 through a data signal line Data_L. According to an embodiment, the controller 24 may transmit a specific command relating to specific sampling point determination, for example, a "tuning command", to the memory device 200. The controller 24 may receive a specific data signal from the memory device 200 in response to the specific command. During this process, the controller 24 may receive the specific data signal as a first data signal corresponding to a clock signal without delay. Additionally, the controller 24 may receive the specific data signal as a second data signal corresponding to a clock signal with delay. The controller 24 may determine a specific sampling section of the received data signal in response to the received first data signal and second data signal and may check the validity of a signal during each corresponding sampling section. According to an embodiment, the controller 24 may divide the first data signal and second data signal corresponding to one clock period into a specific number of sections to define a sampling section and check the validity of a signal for each sampling section. The controller 24 may detect an invalid section from each sampling section and may determine a suitable sampling point by referring to the detected invalid section (where the sampling point avoids the invalid section).

According to various embodiments, the controller 24 may transmit to the memory device 200 a command relating to a type change of the memory device 200. The controller 24 may test the validity of a signal for each specific sampling section with respect to a first data signal received from the memory device 200 before a type change and a second data signal received from the memory device 200 after a type change. After detecting an invalid section of a data signal, the controller 24 may determine a sampling point on this basis.

According to various embodiments, the controller 24 may control an operation relating to a clock change. For example, the controller 24 writes a power setting value relating to a clock change in the buffer 23 to change a clock delivered to the memory device 200 through the detection support device 22. For example, a clock change may occur when a delivered clock is changed by clock selection terminal 21 from a clock provided on one of terminals 25 to another one of the terminals 25. The controller 24 may deliver a predetermined specific command to the memory device 200 before or after a clock change. The controller 24 may check a first data signal received from the memory device 200 before a clock change and a second data signal received from the memory device 200 after a clock change. During this process, the controller 24 may detect a signal invalid section of a first data signal and a second data signal. The controller 24 may determine a suitable or optimum sampling point on the basis of the signal invalid section. According to various embodiments, the controller 24 may deliver a specific command e.g. the tuning command) relating to memory device tuning to the memory device 200 after a clock change. The controller 24 may receive a predetermined second data signal from the memory device 200 after the clock change. The controller 24 may then determine a suitable sampling point in the same way as described above, i.e., detect a signal invalid section by using the second data signal, and determine a sampling point on the basis of the signal invalid section. The controller 24 may perform a control to restore a clock change to a previous state after the sampling point detection.

The host control module 20 and the memory device 200 may be connected through a clock signal line CLK, a command signal line CMD, and a data signal line Data_L. One end of each of the signal lines CLK, CMD, and Data_L may be connected to the host control module 20 and the other may be connected to the memory device 200.

The clock signal line CLK may be a line through which a clock selected by the clock selection terminal 21 is delivered to the memory device 200 through the detection support device 22. The detection support device 22 may change at least one of the period and amplitude of a clock in correspondence with a setting. Accordingly, at different times the clock signal line CLK may deliver a clock in first form and a clock in second form. Herein, the clock in first form may have a form relating to the initialization and management of the memory device 200. The clock in second form may have a form relating to a sampling point detection during the initialization of the memory device 200. The clock in second form may be temporarily managed in relation to sampling point detection.

The command signal line CMD may be a line delivering various commands to memory device 200 relating to initialization thereof. The command signal line CMD may be a line delivering at least one command relating to at least one of data read, write, delete, or transfer operations of the memory device 200.

The data signal line Data_L may be a line through which a specific data signal corresponding to a request of the host control module 220 is delivered from the memory device 200 to the host control module 20 during the initialization process. The data signal line Data_L may be a line through which data written in the memory area 220 is delivered to the host control module 20 during a read operation. The data signal line Data_L may also deliver a data signal from the host control module 20 to the memory device 200 during a write operation. The data signal line Data_L may include at least one line according to the support (or physical characteristic) of the electronic device 100 and the memory device 200.

According to various embodiments, the memory device 200 may include a sub control module 210 and a memory area 220. The sub control module 210 may be part of memory interface 170 of FIG.1, and may communicate with the host control module 20 to perform many of the operations involving memory 200 described above. For instance, according to an embodiment, the sub control module 210 may receive a clock signal and a command from the host control module 20. In response, the sub control module 210 may deliver a specific data signal to the host control module 20 in correspondence to the received clock signal and command. According to an embodiment, the sub control module 210 may deliver a first data signal to the host control module 20 in correspondence to the received clock signal and command. This signal may be a first data signal, and in response thereto, the sub control module 210 may receive a delayed clock signal and specific command, and, may deliver a second data signal to the host control module 20. According to an embodiment, the sub control module 210 may receive the changed clock signal and specific command and in response to this, may deliver a third data signal to the host control module 20. Here, the third data signal may have a similar or different form than the second data signal. According to an embodiment, the sub control module 210 may receive a clock signal, a type change command, and a tuning related command. The sub control module 210 may deliver a fourth data signal to the host control module 20 in response to the type change command. In this regard, the fourth data signal may be a signal of which at least one of the period and amplitude of a signal is changed compared to a signal before the type change.

The memory area 220 may be a physical area where data is stored and read. Specific data may be written in or read from the memory area 220 in response to a control of the sub control module 210. The memory area 220 may be a NAND flash type. In other implementations, memory area 220 may be any of various suitable types, for example, NOR, Random Access Memory (RAM), Static RAM (SRAM), and Read-Only Memory (ROM).

Figure 3:
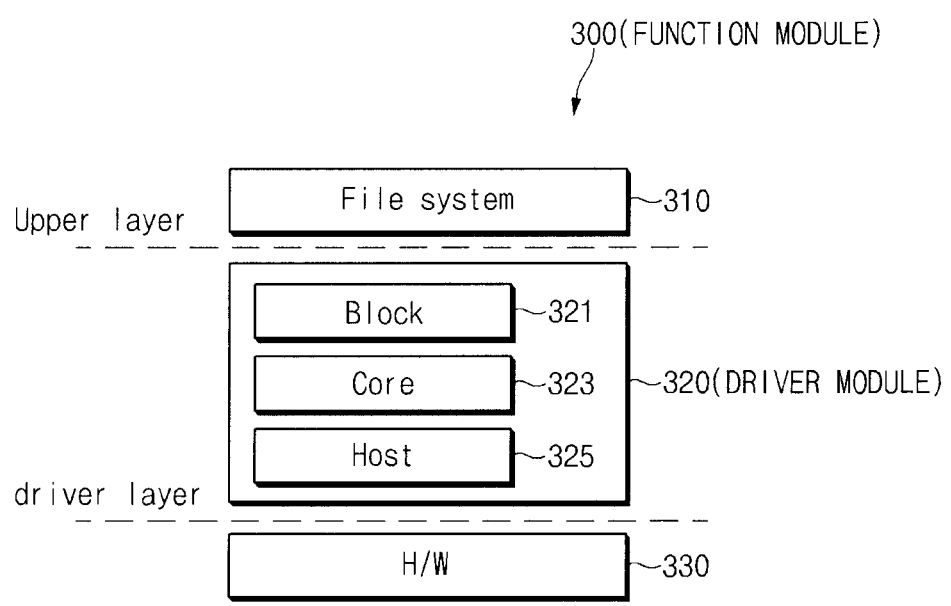
FIG. 3 is a block diagram illustrating function modules of an electronic device according to an embodiment.

FIG. 3 is a view illustrating function modules of an electronic device according to an embodiment. Function module 300 of electronic device 100 may include a hardware module 330, a driver module 320, and a file system module 310. At least a portion of the function module 300 may be implemented in at least one form of hardware, software, and middleware. For example, driver module 320 and file system module 310, or a file system module of the driver module 320 may be a software block loaded into and running on the control module 160 shown in FIGS. 1 and 2, and hardware 330 may be part of control module 160.

The hardware module 330 may control an operation of the host control module 20 described with reference to FIG. 2 (hardware module 330 may also form a part of control module 20). For example, the hardware module 330 may deliver a command set to the controller 24 in response to a command of the driver module 320 to write a specific impedance setting value or a specific power setting value in the buffer 23. The hardware module 330 may collect data signals that the controller 24 receives from the memory device 200 and may then deliver them to the driver module 320.

The driver module 320 may include a block module 321, a core module 323, and a host module 325.

The block module 321 may control read and write operations of specific data by communicating with an upper layer, for example, the file system module 310. According to an embodiment, the block module 321 may deliver a specific command block to the core module 323 or the host module 325. For example, the block module 321 may deliver a command block relating to the tuning of the memory device 200 to the host module 325.

The core module 323 may perform various data processing relating to the initialization of the memory device 200. For example, the core module 323 may control the delivery, test, and processing of a command necessary for the initialization of the memory device 200 in accordance with a prescribed specification.

The host module 325 may control the tuning test of the memory device 200 and the access of the buffer 23 through communication with the hardware module 330. For example, the host module 325 may receive a command block relating to the memory device 200 from the block module 321 and this may operate the host control module 20 through the hardware module 330. The host module 325 may receive a data signal delivered by the memory device 200 from the hardware module 330 and may perform a test on a valid section and an invalid section of the data signal. The host module 325 may determine an appropriate sampling point on the basis of the detected valid section.

According to an embodiment, the host module 325 may determine a temporal position at a specific time before or after the detected invalid section as a sampling point. For example, the host module 325 may determine a specific section point before reaching an invalid section or a specific section point after an invalid section as a sampling point. During this process, the host module 325 may deliver a change signal to the memory device 200. In response to the change signal, memory device may provide setting data, host module 325 analyzes the setting data and may determine a sampling point based on the analysis. The change signal may include at least one of a delay clock delaying an original clock signal, a change clock changing the waveform of an original clock signal, and type information that differs from type information set in the memory device 200.

The file system module 310 may perform controls of the data read and write operations of the memory device 200 and the deletion and transfer of data through the driver module 320 as an upper layer. For example, if a data read operation is required in correspondence with the execution of a specific application of the electronic device 100, the file system module 310 may perform the access of the memory device 200 having related data written therein through the driver module 320 and the hardware module 330. Then, the file system module 310 may read data written at a corresponding position of the memory device 200 and may deliver this to the application. If a data write operation is required, the file system module 310 may deliver corresponding data to the corresponding memory device 200 through the driver module 320 and the hardware module 330.

Figure 4:
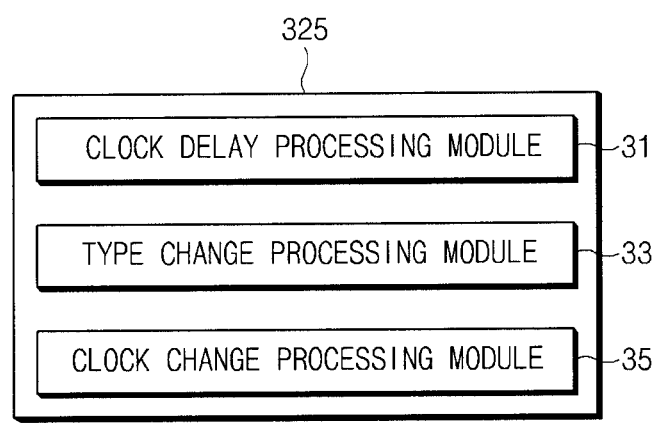
FIG. 4 is a block diagram illustrating a host module according to an embodiment.

FIG. 4 is a block diagram illustrating an example host module 325 according to an embodiment Host module 325 may include at least one of a clock delay processing module 31, a type change processing module 33, and a clock change processing module 35.

The clock delay processing module 31 may access the buffer 23 in correspondence with a setting of the electronic device 100. The clock delay processing module 31 may write a specific impedance setting value in the buffer 23. When this specific impedance setting value is written in the buffer 23 through the clock delay processing module 31, the detection support device 22 may be adjusted to have the impedance setting value written in the buffer 23. Accordingly, while a specific clock signal is delivered to the memory device 200 through the detection support device 22, it may be delivered in the form in which the specific clock signal is delayed by a specific time interval through the detection support device 22. The clock delay processing module 31 may perform the access of the buffer 23 and an impedance setting value writing operation during a tuning process.

According to an embodiment, after a first clock signal is delivered to the memory device 200, the clock delay processing module 31 may perform an operation control relating to an impedance change of the detection support device 22. When a second clock signal is delivered to the memory device 200 through the detection support device 22 after the first clock signal, it is delayed in correspondence with a changed impedance and then supplied. Here, each of the first and second clock signals may be at least one of a plurality of clock signals supplied from the clock input terminals 25. According to an embodiment, the first clock signal may be at least one of N clock signals that are provided as the clock selection terminal 21 sequentially selects the first input terminal to the Nth input terminal. Like the first clock signal, the second clock signal may be at least one of the N clock signals. According to various embodiments, the first clock signal is a clock signal delivered through the first input terminal of terminals 25 and the second clock signal may be a clock signal delivered through another one of input terminals 25.

The clock delay processing module 31 may receive a first data signal corresponding to the first clock signal and a second data signal corresponding to the second clock signal from the memory device 200. The clock delay processing module 31 may analyze the data signals by dividing the first data signal and the second data signal into sections by a check whether a signal is valid for each section. The clock delay processing module 31 may determine a sampling point on the basis of information on a valid section and an invalid section of a signal.

According to various embodiments, the clock delay processing module 31 may temporarily store determination information on a first sampling point collected through clock delay. After collecting the first sampling point information, the clock delay processing module 31 may request another sampling point information from at least one of the type change processing module 33 and the clock processing module 35. According to an embodiment, the clock delay processing module 31 may collect second sampling point information from the type change processing module 33. The clock delay processing module 31 may detect specific sampling point information on the basis of the collected first sampling point information and second sampling point information. According to various embodiments, the clock delay processing module 31 may collect third sampling point information from the clock change processing module 35. The clock delay processing module 31 may detect specific sampling point information on the basis of the collected first sampling point information and third sampling point information.

According to various embodiments, the clock delay processing module 31 may detect specific sampling point information on the basis of the first, second and third sampling point information. For example, the clock delay processing module 31 may select an average value of the collected first, second and third sampling point information, as specific sampling point information. Or, the clock delay processing module 31 may select specific sampling point information on the basis of position information of an invalid section from at least one of the type change processing module 33 and the clock change processing module 35 and position information of an invalid section detected by the clock delay processing module 31. For example, the clock delay processing module 31 may determine a temporal position that is a specific time interval away from at least one invalid section position as a sampling point.

The type change processing module 33 may access the controller 24 in correspondence with a setting of the electronic device 100 to deliver type change information to the memory device 200. For example, the type change processing module 33 may deliver change information of type different from that set in the current memory device 200 to the memory device 200. The type change processing module 33 may collect a tuning related first data signal received from the memory device 200 before type change and a tuning related second data signal received from the memory device 200 after type change. The type change processing module 33 may determine a specific sampling point on the basis of a signal invalid section detected from at least one of the received tuning related first data signal and second data signal. The type change processing module 33 may collect sampling point related information by additionally using at least one of the clock delay processing module 31 and the clock change processing module 35 in correspondence with a setting of the electronic device 100. The type change processing module 33 may determine a specific sampling point on the basis of the additionally collected sampling point related information and the sampling point related information collected by the type change processing module 33.

The clock delay processing module 35 may access the buffer 23 in correspondence with a setting of the electronic device 100. The type change processing module 33 may write a power setting value in the buffer 23 in correspondence with a setting. The written power setting value may be applied to the adjustment of a device relating to a waveform change of a clock in the detection support device 22. Accordingly, the clock change processing module 35 may change at least one of the amplitude and period of a clock signal or change the slope of a clock waveform to deliver it to the memory device 200. Or, the clock change processing module 35 may change the driver strength of a clock as a specific driver strength type changes. The clock change processing module 35 may perform a sampling point detection on the basis of a first data signal received from the memory device 200 before a clock waveform change and a second data signal received from the memory device 200 after a clock waveform change. The type change processing module 35 may collect information relating to sampling point detection from at least one of the clock delay processing module 31 and the type change processing module 35 in correspondence with a setting of the electronic device 100. The type change processing module 35 may detect a specific sampling point on the basis of information relating to the detection of a sampling point collected by itself and information relating to the detection of a sampling point received from another module.

As mentioned above, the electronic device 100 may include a clock generator 10 generating a clock signal transmitted to the memory device 200 and a host control module 20, which transmits a change signal or a tuning related command to the memory device 200. Host control module 20 then determines a sampling point of a data signal on the basis of setting data received from the memory device 200 in correspondence with the change signal or the tuning related command.

According to various embodiments, the host control module 20 may perform a control to transmit at least one of a changed clock signal obtained by changing the waveform of a clock signal transmitted to the memory device 200, a delay clock signal time-delaying the clock signal, and type change information of the memory device 200 to the memory device 200.

According to various embodiments, the electronic device 100 may further include a clock control device changing a power setting value of the clock signal in relation to a waveform change of the clock signal.

According to various embodiments, the electronic device 100 may further include a delay device changing the impedance of a path through which the clock signal is delivered.

According to various embodiments, the host control module 20 may determine the sampling point on the basis of setting data corresponding to a clock signal before the changed clock signal transmission and setting data received after the changed clock signal transmission, or may determine the sampling point on the basis of setting data corresponding to a clock signal transmitted before the delay clock signal transmission and setting data received after the delay clock signal transmission.

According to various embodiments, the host control module 20 may change the changed clock signal to a previous clock signal after the sampling point determination or the setting data reception, or may change the delay clock signal to a previous clock signal after the sampling point determination or the setting data reception.

According to various embodiments, the host control module 20 may determine the sampling point by analyzing setting data received from the memory device 200 after the change type information transmission.

According to various embodiments, the host control module 20 may transmit previous type information to the memory device 200 after the sampling point determination or after the setting data reception.

According to various embodiments, the host control module 20 may detect at least one of a valid section and an invalid section from the received setting data and may determine a specific point as a sampling point on the basis of the detected section.

According to various embodiments, the host control module 20 may detect an invalid section from the received setting data and may determine a point spaced a specific time interval away from the invalid section as the sampling point.

Figure 5:
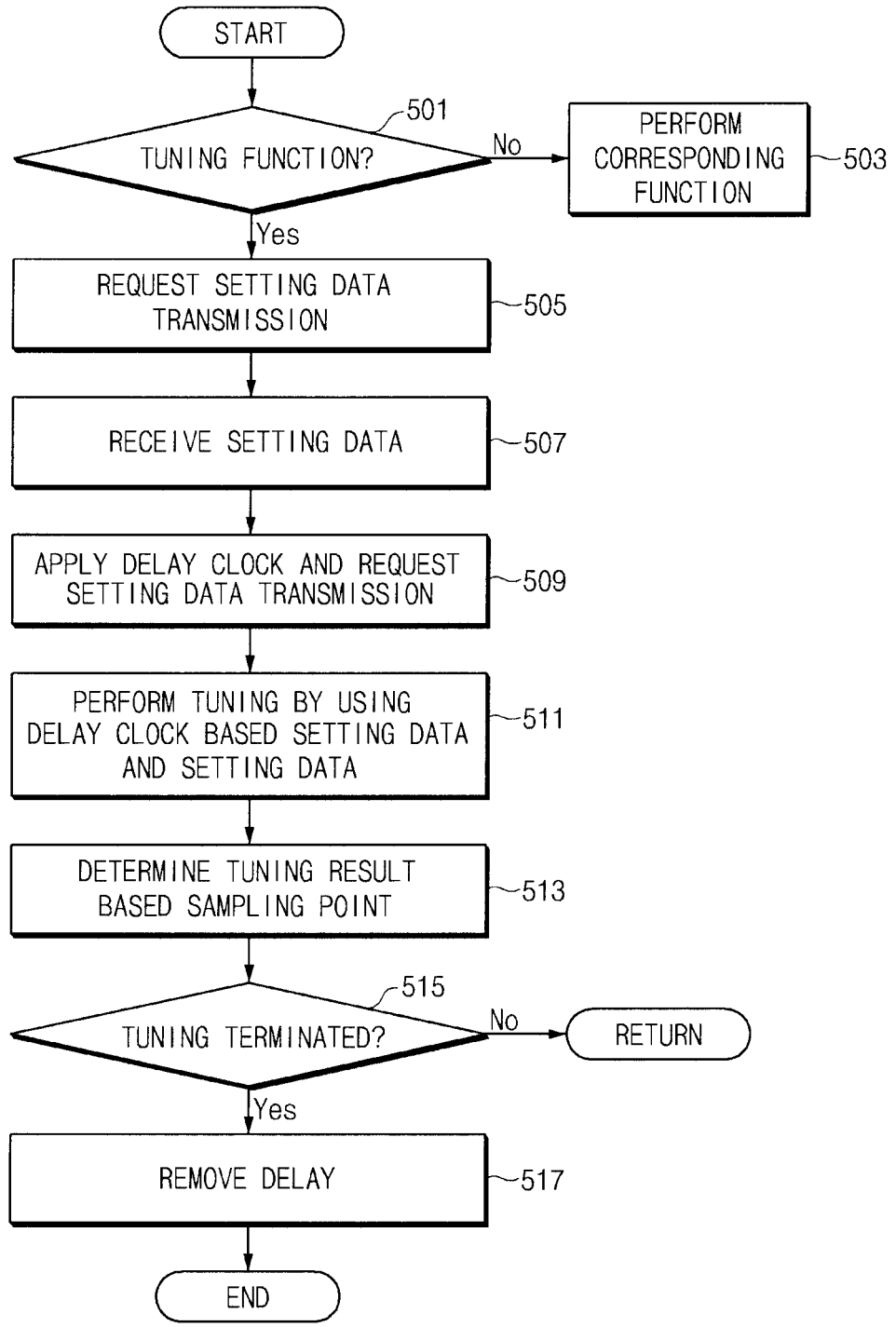
FIG. 5 is a flow chart illustrating a clock delay based memory device initializing method according to an embodiment.

FIG. 5 is a flow chart illustrating a clock delay based memory device initializing method according to an embodiment. In the following description, it is assumed that control module 160 of device 100 may control all operations.

First, in operation 501, the control module 160 may check whether an event relating to tuning function execution occurs. If not, a non-tuning function execution may occur (503). If the event relating to tuning function execution occurs in operation 501, setting data may be requested for transmission (505). For example, the control module 160 may deliver a specific tuning related command CMD to the memory device 200 through the memory interface 170. During this process, the control module 160 may deliver a clock signal relating to the drive of the memory device 200 to the memory device 200. When receiving a clock signal and a tuning related command, the memory device 200 may deliver specific setting data to the control module 160. Accordingly, the control module 160 may receive setting data from the memory device 200 (507).

The control module 160 may next perform a delay clock application and a setting data transmission request (509). For example, the control module 160 may control an impedance change of the detection support device 22 disposed on a clock signal line CLK through which a clock signal is supplied. When an impedance of the detection support device 22 is changed, a clock signal supplied to the memory device 200 through the clock signal line CLK may be delayed in correspondence to an impedance change. The control module 160 may transmit a delayed clock signal and a tuning related command to the memory device 200. The memory device 200 may deliver specific setting data to the control module 160 in response to a tuning related command and may deliver setting data having a specific delay to the control module 160 in response to a delay clock signal.

The control module 160 may perform tuning relating to a sampling point detection of the memory device 200 by using setting data received based on a clock having no delay and setting data received based on a delay clock (511). Then, the control module 160 may perform sampling point determination (513). For example, the control module 160 divides setting data by a specific sampling section and may detect whether a signal is valid or invalid in each sampling section. The control module 160 may determine a position spaced a specific distance (in time) away from an invalid section as a sampling point.

The control module 160 may check whether tuning is terminated (515). If a scheduling event or input event relating to tuning function termination occurs, the control module 160 may perform delay removal (517). For example, the control module 160 may restore an impedance value of the detection support device 22 to a value before change. If the tuning is not terminated in operation 515, the control module 160 may perform an additional tuning process in correspondence to a setting of the electronic device 100. For example, the control module 160 may perform at least one of the type change based tuning process and the clock change based tuning process, which are described with reference to FIGS. 7 and 9.

Figure 6:
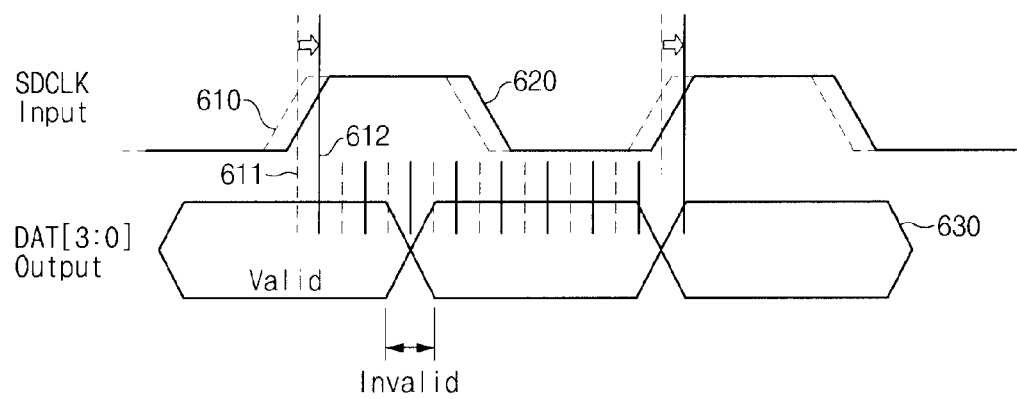
FIG. 6 shows example waveforms illustrating a sampling point detection of a clock delay based method according to an embodiment.

FIG. 6 is a timing diagram illustrating example waveforms in sampling point detection of a clock delay based memory device according to an embodiment. As shown in FIG. 6, a clock signal 610 may be generated in the clock generator 10 and may then be delivered to the memory device 200 through the host control module 20. Assume that host control module 20 delivers a tuning command to the memory device 200. In response to the tuning command, the memory device 200 may deliver a specific data signal 630 to the host control module 20.

It is seen that data signal 630 is delayed relative to the clock signal 610, and this delay may correspond to the delay incurred by switching times and so forth in actually reading data from memory 200 and outputting the read data to host control module 20.

Following the clock waveform 610, the host control module 20 may deliver a clock signal 620 delaying the same clock signal as the clock signal 610 by a specific time interval in addition to a tuning related command to the memory device 200. In response to this signal 620, the memory device 200 may again deliver tuning related specific setting data (not shown) to the host control module 20 as another delayed response signal (which would be delayed relative to signal 630 by approximately the same time interval that signal 620 is delayed relative to signal 610). When testing signal validity or invalidity on the same sampling section, the host control module 20 may have the effect of subdividing and testing data signals in response to the clock signal 610 and the clock signal 620.

For example, the host control module 20 may perform a signal validity or invalidity test on the sampling sections 611 (i.e., the time points coinciding with the dotted vertical lines) with respect to the data signal 630 and may also perform a signal validity or invalidity text on the sampling sections 612 (the time points coinciding with the solid vertical lines) with respect to the data signal 630. The data signal 630 may have a valid section "Valid" detectable as a steady "high" or "low" logic voltage level, and an invalid section "Invalid" detectable as a transitioning voltage level in between the steady high and low levels as shown in the drawing. If performing signal detection in the valid section valid, the host control module 20 may check a validity result. Moreover, if performing signal detection in the invalid section Invalid, the host control module 20 may check an invalidity result. Accordingly, the host control module 20 may determine a temporal position a specific section (in time) away on the basis of a sampling section where an invalidity result is detected, as a suitable or optimum sampling point for subsequent data read operations from memory 200.

Figure 7:
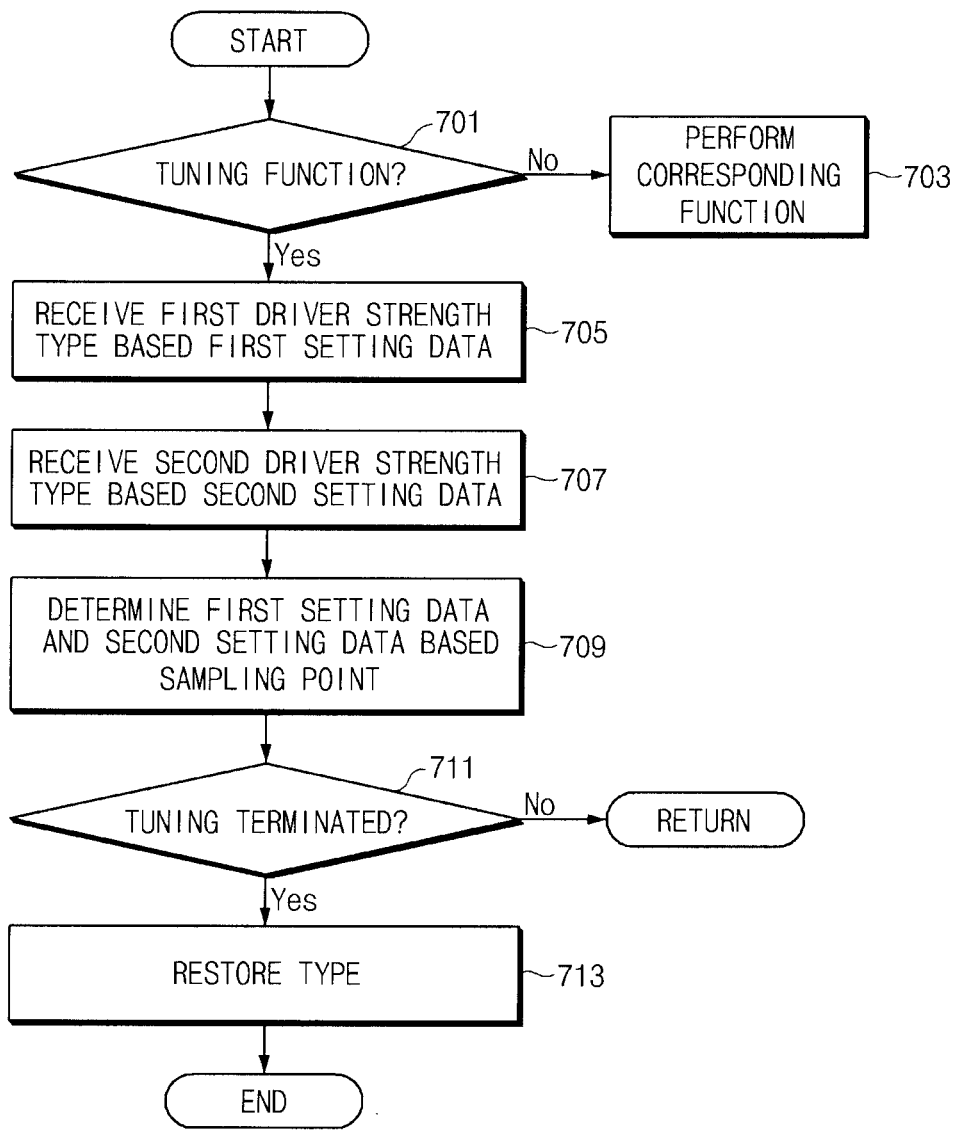
FIG. 7 is a flow chart illustrating a "type change" based memory device initializing method according to an embodiment.

FIG. 7 is a flow chart illustrating a "type change" based memory device initializing method according to an embodiment.

As shown in FIG. 7, the control module 160 may check an event occurrence relating to tuning function execution in operation 701. If the tuning related event does not occur in operation 701, a non-tuning-related event function occurs (703). If the tuning related event occurs in operation 701, the control module 160 may receive first setting data based on a specific first driver strength type based in operation 705. For example, the control module 160 may deliver B type information and a tuning related command to the memory device 200. The memory device 200 may provide predetermined first setting data (in the form of a waveform) corresponding to the B type information and the tuning related command to the control module 160. The setting data waveform provided by the memory device 200 may differ for different respective types of information (A, B, C or D).

The control module 160 may receive second setting data based on a specific second driver strength type in operation 707. For example, the control module 160 may deliver C type information and a tuning related command corresponding to the second driver strength type to the memory device 200. The memory device 200 may provide predetermined second setting data corresponding to the C type information and the tuning related command to the control module 160.

The control module 160 may determine a first setting data and second setting data based sampling point in operation 709. During this process, the control module 160 may divide the first setting data and the second setting data by a specific temporal sampling section and may check whether a signal is valid for each sampling section.

The control module 160 may check whether an event relating to tuning termination occurs in operation 711. If so, the control module 160 may restore a type in operation 713. For example, when delivering the C type information to the memory device 200 during tuning function execution, the control module 160 may deliver previous type information, for example, the B type information, to the memory device 200 after tuning function termination. According to various embodiments, the display module 160 may deliver previous type information to the memory device 200 after second setting data reception. Or, the control module 160 may deliver previous type information to the memory device 200 after delivering change type information in addition to a clock signal and a tuning related command to the memory device 200.

If there is no tuning related event occurrence in operation 711, the control module 160 may perform an additional tuning process in correspondence with a setting of the electronic device 100. For example, the control module 160 may perform at least one process of a delay clock based tuning process and a change clock based tuning process. The control module 160 may determine a specific sampling point by combining sampling point information detected from a delay clock based tuning process and a change clock based tuning process and sampling point information detected from a type change based tuning process. During this process, the control module 160 may determine a sampling point by applying the same weight value to a first result value of a delay clock based tuning process, a second result of a change clock based tuning processing, and a third result value of a type change based tuning process. Or, the control module 160 may determine a sampling point by differently applying a weight value of each of result values. For example, the control module 160 may set a weight value of a first result value to be higher than weight values of other result values. Such a weight value design may be applied and changed according to experimental and statistical results.

Figure 8:
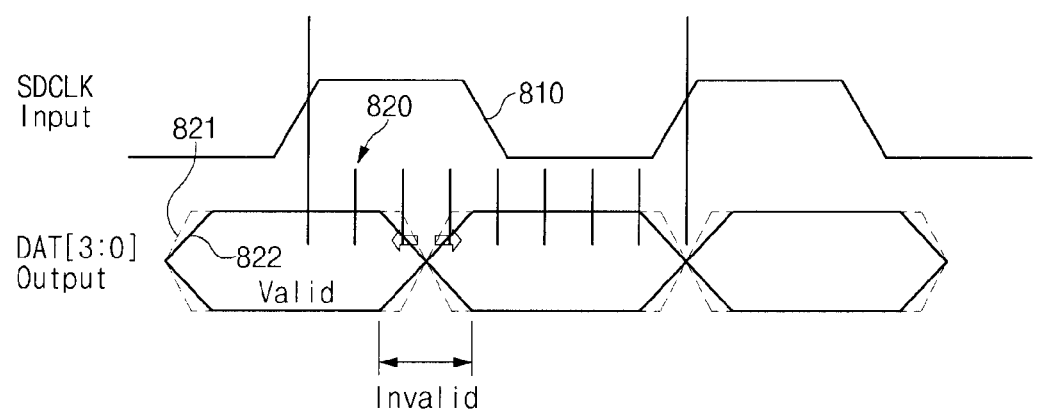
FIG. 8 shows example waveforms illustrating a sampling point detection of a type change based method according to an embodiment.

In the above description, B type information and C type information may be information defining the electrical characteristics of the memory device 200 in correspondence to the physical characteristics of the electronic device 100. For example, the type information may be a specific resistance value for each characteristic and a value defining driving capability FIG. 8 shows example waveforms for sampling point detection associated with a type change based method. As shown in FIG. 8, the control module 160 may deliver first type information, a clock signal 810, and a tuning related command to the memory device 200. In correspondence with the received information, the memory device 200 may deliver a data signal 821 to the control module 160, for example, the controller 24 of the host control module 20. Here, the data signal 821 may correspond to the first setting data described with reference to FIG. 7.

After receiving the data signal 821, the control module 160 may deliver second type information, a second clock signal 810, and a second tuning related command to the memory device 200. In response to the received second type information, second clock signal 810, and the second tuning related command, the memory device 200 may deliver a data signal 822 to the control module 160. Here, the data signal 822 may correspond to the second setting data described with reference to FIG. 7.

The control module 160 may divide a data signal section corresponding to one clock period into a specific number of sampling sections, for example as separated by internal divider 820. The control module 160 may perform the validity review of a signal for each of the sampling sections. For example, the control module 160 may detect a valid section "Valid" and an invalid section "Invalid", in the same or similar manner described above for the waveform analysis of FIG. 6. The control module 160 may determine a specific sampling point by determining the time points where the detected Valid and Invalid sections occur relative to the rising or falling edge of clock signal 810.

According to various embodiments, the control module 160 may determine a suitable or optimum sampling point for subsequent data read operations by using the second setting data described with reference to FIG. 7 or the data signal 822 described with reference to FIG. 8. For example, the control module 160, as shown in FIG. 8, may detect an invalid section Invalid by using the data signal 822 where the invalid section Invalid of the data signal 821 extends. The control module 160 may determine a valid specific section as a sampling point on the basis of information on the detected invalid section Invalid. Through this, the control module 160 may increase the detection probability of an invalid section Invalid. In relation to the above-mentioned function support, if a tuning function is executed, the control module 160 may deliver change type information to the memory device 200 and may provide this change type information after/before a specific clock period to the memory device 200. Or, if the tuning function is terminated, the control module 160 may deliver previous type information to the memory device 200.

Figure 9:
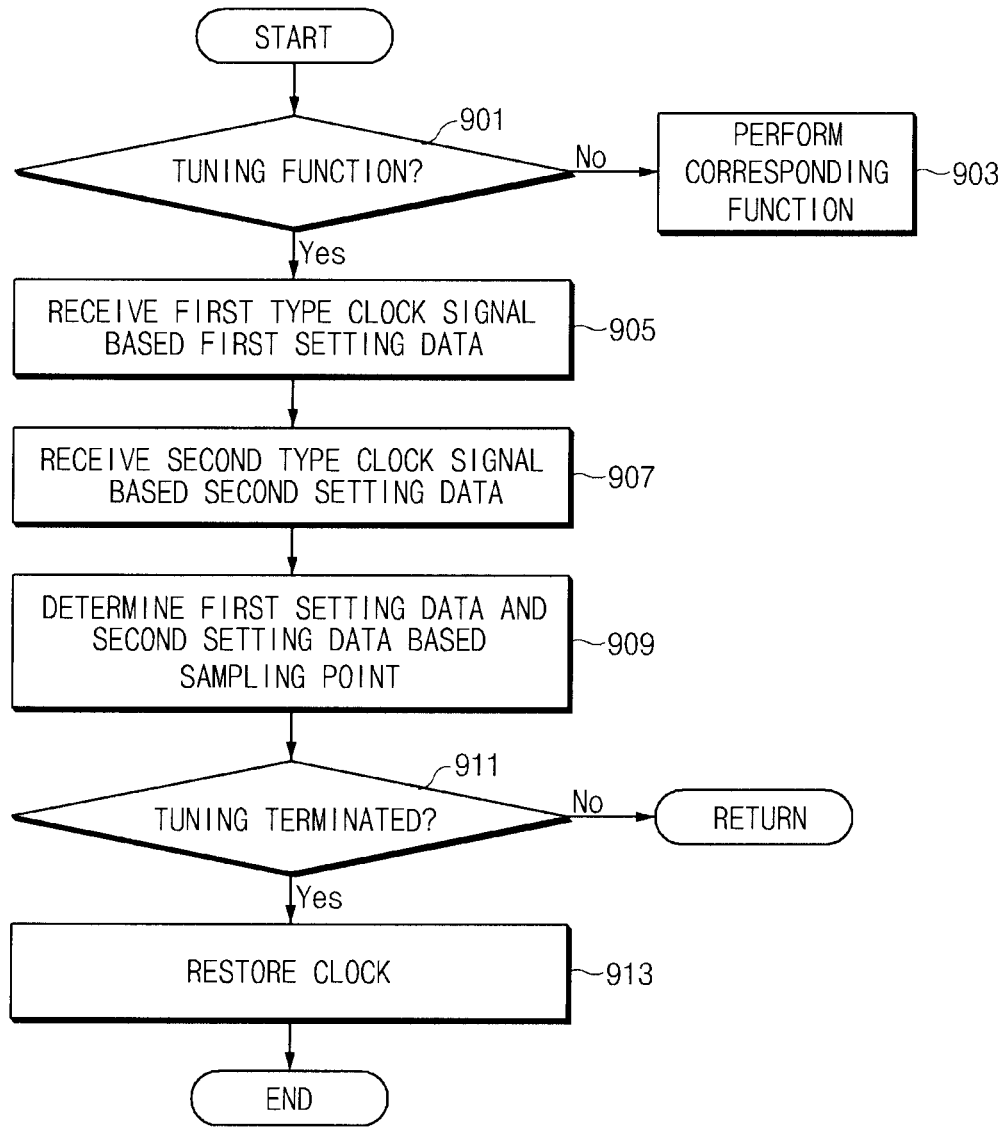
FIG. 9 is a flow chart illustrating a clock change based memory device initializing method according to an embodiment.

FIG. 9 is a flow chart illustrating a clock change based memory device initializing method according to an embodiment. As shown in FIG. 9, the control module 160 may check whether a tuning function is executed in operation 901. If there is no tuning function execution scheduling or request, the control module 160 may control the function execution corresponding to specific scheduling information in operation 903.

If the tuning function execution is requested in operation 901, the control module 160 may receive first type clock signal based first setting data in operation 905. For example, the control module 160 may deliver a clock signal in a first waveform having a first amplitude and first period in addition to a tuning related command to the memory device 200. The memory device 200 may deliver specific data to the control module 160 in response to the tuning related command and the first type clock signal; this specific data will be referred to as "first setting data". The first setting data may be the same as the specific data.

The control module 160 may receive second type clock signal based second setting data in operation 907. For example, the control module 160 may deliver a clock signal in a second waveform having a different amplitude and/or period than the first amplitude and/or first period in addition to a tuning related command to the memory device 200. In response to the second type clock signal, memory device 200 may deliver setting data corresponding to the tuning related command to the control module 160 and may deliver second setting data(e.g., partially changed first setting data)

to the control module 160. The control module 160 may adjust a device characteristic of the detection support device 22 in order to deliver the second type clock signal. For example, the control module 160 may adjust the detection support device 22 in order to change a power value of a clock signal. Or, the control module 160 may perform a switching control to deliver a second type clock signal to the memory device 200 through the detection support device 22 having a specific power setting value.

The control module 160 may determine a sampling point on the basis of the first setting data and the second setting data in operation 909. As the waveform of a clock signal is changed, the memory device 200 may transmit a delayed data signal. Accordingly, the second setting data may be a signal that is delayed by a delay time compared to the first setting data. The control module 160 may classify a data signal corresponding to one clock period as a specific sampling section and may perform a validity review on each sampling section.

After the sampling point determination, the control module 160 may check whether an event or scheduling relating to tuning termination occurs in operation 911. If so, the control module 160 may restore a clock in operation 913. For example, the control module 160 may readjust the detection support device 22, which adjusts an original value to change a clock signal, to have the original value again. Or, the control module 160 may deliver a clock signal to the memory device 200 without delay as a supply line of the clock signal bypasses the detection support device 22.

If there is no event or scheduling relating to tuning termination, the control module 160 may collect tuning related information by performing at least one process of a delay clock based tuning process and a type change based tuning process in response to a setting of the electronic device 100. The control module 160 may adjust a sampling point determination value by using the collected tuning related information.

Figure 10:
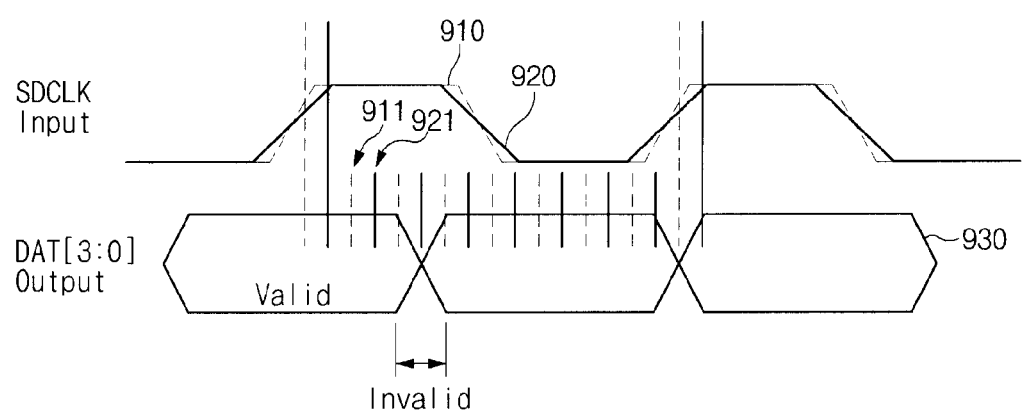
FIG. 10 shows example waveforms illustrating a sampling point detection method of a clock change based memory device according to an embodiment.

FIG. 10 shows example waveforms illustrating a sampling point detection method of a clock change based memory device according to an embodiment. As shown in FIG. 10, the control module 160 may deliver a clock signal 910 to the memory device 200. At this point, the control module 160 may deliver a tuning related command to the memory device 200. The memory device 200 may deliver a specific data signal, for example, the first setting data described with reference to FIG. 9, to the control module 160 in response to the clock signal 910 and the tuning related command.

After the first setting data reception, the control module 160 may deliver the clock signal 920 (sometimes referred to herein as a "changed clock") to the memory device 200. In relation to this, the control module 160 may control a device adjustment or switching operation for changing a clock signal. When transmitting the clock signal 920, the control module 160 may deliver a tuning related command to the memory device 200. The memory device 200 may deliver a data signal corresponding to a tuning related command to the control module 160 and may deliver a data signal delayed by a delay time, for example, a second data signal, to the control module 160 in response to the clock signal 920.

The control module 160 may receive data signals corresponding to the clock signal 910 and the clock signal 920 and may detect a valid section Valid and an invalid section Invalid of a signal in specific sampling sections, for example, the sampling sections 911 and the sampling sections 921. According to an embodiment, a sampling section of the control module 160 may be defined dynamically (or alternatively, may be predefined). Here, the sampling sections 911 may be associated with the first setting data corresponding to the clock signal 910 and the sampling sections 921 may be associated with the second setting data corresponding to the clock signal 920. Once the first setting data and the second setting data are processed as one data signal, with the divided sampling sections 911 and 912, the effect that one data signal has more detailed sampling sections 911 and 921 is provided.

Figure 11:
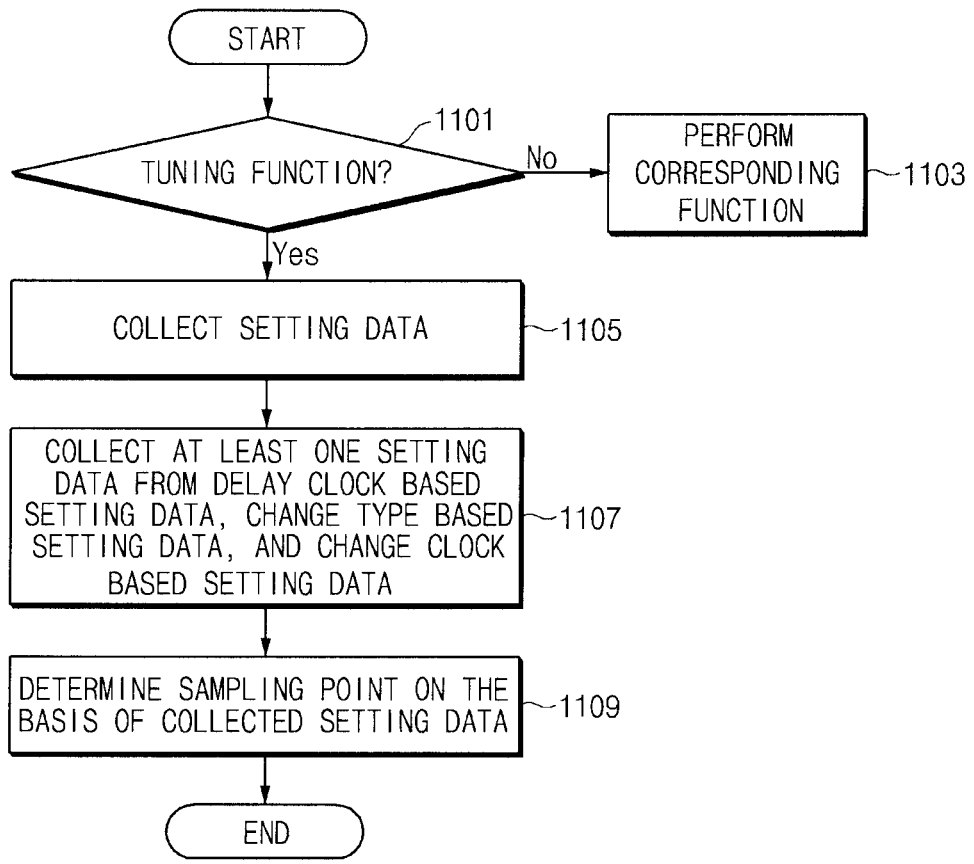
FIG. 11 is a flow chart illustrating an initialization method of a memory device according to an embodiment.

FIG. 11 is a flow chart illustrating an initialization method of a memory device according to an embodiment. As shown in FIG. 11, the control module 160 may check whether a tuning function related scheduling or event occurs in operation 1101. If not, the control module 160 may control a specific function execution or maintain a previous state in operation 1103.

If the tuning function related scheduling or event occurs in operation 1101, the control module 160 may collect setting data in operation 1105. For example, the control module 160 may deliver a clock signal in first waveform, a tuning related command, and first type information to the memory device 200 and may collect setting data corresponding thereto in operation 1105.

The control module 160 may collect at least one of delay clock based setting data, type change based setting data, and clock change based setting data in operation 1107. According to an embodiment, the control module 160 may deliver a delay clock signal delaying a clock signal in first waveform, a tuning related command, and first type information to the memory device 200 and may collect delay based setting data corresponding thereto. The control module 160 may deliver a clock signal in a first waveform, a tuning related command, and second type information to the memory device 200 and may collect change type based setting data corresponding thereto in operation 1107. The control module 160 may further deliver a clock signal in a second waveform different from a clock signal in a first waveform, a tuning related command, and first type information to the memory device 200 and may collect clock change based setting data corresponding thereto in operation 1107. According to various embodiments, the control module 160 may collect setting data obtained by applying at least one of the clock change, clock delay, and type change. For example, the control module 160 may collect setting data obtained by applying clock change and type change. The control module 160 may collect setting data obtained by applying clock delay and type change.

The control module 160 may determine a sampling point by using the collected setting data in operation 1109. For example, the control module 160 may detect a valid section and an invalid section from setting data and may determine a temporal position spaced a specific interval from the detected invalid section as a sampling point.

As mentioned above, according to an embodiment, a memory initializing method may include transmitting a change signal or a tuning related command to the memory device 200, receiving setting data corresponding to the change signal or tuning related command from the memory device 200, and determining a sampling point of a data signal on the basis of the received setting data.

According to various embodiments, the transmitting of the change signal or the tuning related command may include transmitting a changed clock signal having a changed waveform of a clock signal transmitted to the memory device 200, transmitting a delay clock signal delaying the clock signal by a specified time, and transmitting type change information of the memory device 200.

According to various embodiments, the transmitting of the changed clock signal may include changing a power setting value of the clock signal.

According to various embodiments, the transmitting of the delay clock signal may include changing an impedance of a path through which the clock signal is delivered.

According to various embodiments, the determining of the sampling point may include determining the sampling point on the basis of setting data corresponding to a clock signal before the changed clock signal transmission and setting data received after the changed clock signal transmission, and determining the sampling point on the basis of setting data corresponding to a clock signal transmitted before the delay clock signal transmission and setting data received after the delay clock signal transmission.

According to various embodiments, the method may include changing the changed clock signal to a previous clock signal after the sampling point determination or the setting data reception, or may change the delay clock signal to a previous clock signal after the sampling point determination or the setting data reception.

According to various embodiments, the determining of the sampling point may include determining the sampling point by analyzing the setting data received from the memory device 200 after the change type information transmission.

According to various embodiments, the method may further include transmitting previous type information to the memory device 200 after the sampling point determination or after the setting data reception.

According to various embodiments, the determining of the sampling point may include detecting at least one of a valid section and an invalid section from the received setting data and determining a specific point as a sampling point on the basis of the detected section.

According to various embodiments, the determining of the sampling point may include detecting an invalid section from the received setting data and determining a time point a specific time interval away from the invalid section as the sampling point.

Figure 12:
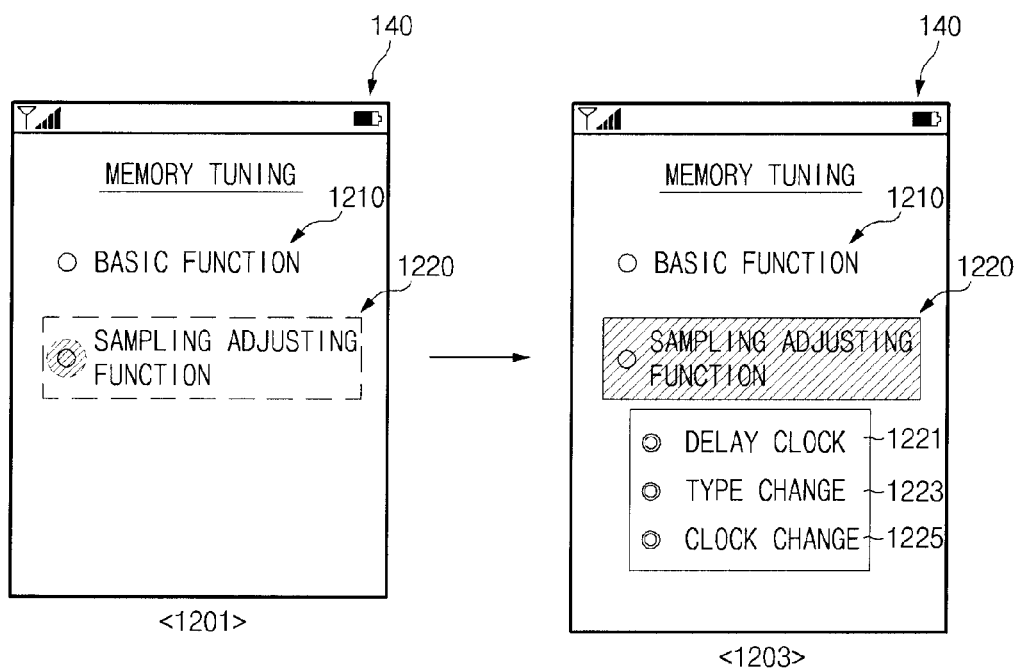
FIG. 12 illustrates an example screen interface relating to memory device initialization according to an embodiment.

FIG. 12 is a view illustrating a screen interface relating to memory device initialization according to an embodiment. As shown in FIG. 12, the electronic device 100 may include a display 140. The display 140 may output a screen relating to memory tuning as shown in a screen 1201. In relation to this, the display 140 may output an icon or menu item relating to memory tuning. If a memory tuning related request occurs, the display 140 may output a screen including a basic function item 1210 and an expanded item 1220. The basic function item 1210 may be an item set to apply a predefined specific method during memory tuning. For example, the basic function item 1210 may be an item for delivering a clock signal in first waveform in addition to first type information and a tuning related command to the memory device 200 and performing a setting to determine a sampling point by using the collected setting data in response thereto. The expanded item 1220 may be an item for performing a setting to determine a sampling point by additionally applying at least one of clock delay, clock change, and type change.

If the expanded item 1220 is selected from the screen 1201, the display module 140 may output a screen including sub items 1221, 1223, and 1225 of the expanded item 1220 as shown in a screen 1203. The sub items 1221, 1223, and 1225 may include a delay clock item 1221, a type change item 1223, and a clock change item 1225. If a specific item is selected from these, the control module 160 may perform a tuning process of the memory device 200 in correspondence to the selected item. For example, once the delay clock item 1221 is selected, the control module 160 may determine a sampling point by using setting data corresponding to a time delayed clock and setting data corresponding to a non-delayed clock during the tuning process. The control module 160 may control the collection of setting data relating to the sampling point determination in correspondence with at least one selection from the sub items 1221, 1223, and 1225.

The electronic device may detect an appropriate sampling point matching the characteristic of a valid section and an invalid section of a memory representing various characteristics for each manufacturer by using the above-described tuning process. The characteristic of a valid section of a memory device may be changed in correspondence to changes in an external environment, for example, temperature. In response to this, the electronic device may detect a sampling point for properly compensating for an error occurrence according to a temperature change by using the above-mentioned tuning process.

Figure 13:
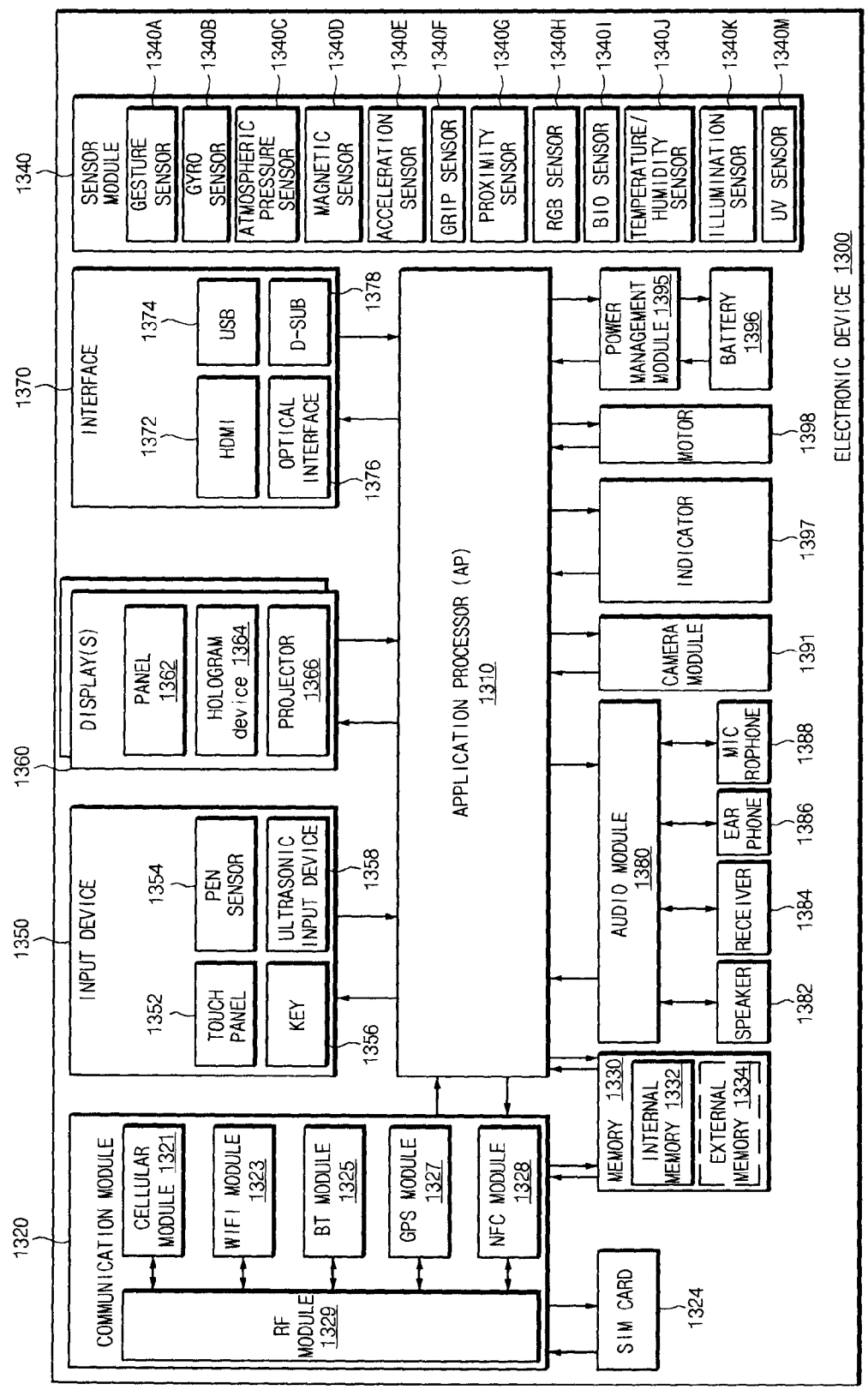
FIG. 13 is a block diagram illustrating an electronic device supporting memory device initialization according to an embodiment.

FIG. 13 is a block diagram illustrating an electronic device configuration supporting memory device initialization according to an embodiment. An electronic device 1301, for example, may configure all or part of the above-mentioned electronic device 100 shown in FIG. 1. As shown in FIG. 13, the electronic device 1301 includes at least one application processor (AP) 1310, a communication module 1320, a subscriber identification module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may control a plurality of hardware or software components connected to the AP 1310 and also may perform various data processing and operations with multimedia data by executing an operating system or an application program. The AP 1310 may be implemented with a system on chip (SoC), for example. According to an embodiment, the processor 1310 may further include a graphic processing unit (GPU) (not shown).

The communication module 1320 may perform data transmission in a communication between the electronic device 1301 (for example, the electronic device 100) and other electronic devices connected thereto through a network. The communication module 1320 may deliver data received from other electronic devices to the memory device 200 in response to a control of the AP 1310. Or, the communication module 1320 may transmit data stored in the memory device 200 to other electronic devices in response to a control of the AP 1310. According to an embodiment, the communication module 1320 may include a cellular module 1321, a Wifi module 1323, a BT module 1325, a GPS module 1327, an NFC module 1328, and a radio frequency (RF) module 1329.

The cellular module 1321 may provide voice calls, video calls, text services, or internet services through a communication network (for example, LTE, LTE-A, CDMA, WCDMA, UMTS, WiBro, or GSM). The cellular module 1321 may perform a distinction and authentication operation on an electronic device in a communication network by using a subscriber identification module (for example, the SIM card 1324), for example. According to an embodiment, the cellular module 1321 may perform at least part of a function that the AP 1310 provides. For example, the cellular module 1321 may perform at least part of a multimedia control function.

According to an embodiment, the cellular module 1321 may further include a communication processor (CP). Additionally, the cellular module 1321 may be implemented with SoC, for example. As shown in FIG. 13, components such as the cellular module 1321 (for example, a CP), the memory 1330, or the power management module 1395 are separated from the AP 1310, but according to an embodiment of the present invention, the AP 1310 may be implemented including some of the above-mentioned components (for example, the cellular module 1321).

According to an embodiment, the AP 1310 or the cellular module 1321 (for example, a CP) may load instructions or data, which are received from a nonvolatile memory or at least one of other components connected thereto, into a volatile memory and then may process them. Furthermore, the AP 1310 or the cellular module 1321 may store data received from or generated by at least one of other components in a nonvolatile memory.

Each of the Wifi module 1323, the BT module 1325, the GPS module 1327, and the NFC module 1328 may include a processor for processing data transmitted/received through a corresponding module. Although the cellular module 1321, the Wifi module 1323, the BT module 1325, the GPS module 1327, and the NFC module 1328 are shown as separate blocks in FIG. 13, according to an embodiment of the present invention, some (for example, at least two) of the cellular module 1321, the Wifi module 1323, the BT module 1325, the GPS module 1327, and the NFC module 1328 may be included in one integrated chip (IC) or an IC package. For example, at least some (for example, a CP corresponding to the cellular module 1321 and a Wifi processor corresponding to the Wifi module 1323) of the cellular module 1325, the Wifi module 1327, the BT module 1328, the GPS module 1321, and the NFC module 1323 may be implemented with one SoC.

The RF module 1329 may be responsible for data transmission, for example, the transmission of an RF signal. Although not shown in the drawings, the RF module 1329 may include a transceiver, a power amp module (PAM), a frequency filter, or a low noise amplifier (LNA). Additionally, the RF module 1329 may further include components for transmitting/receiving electromagnetic waves on a free space in a wireless communication, for example, conductors or conducting wires. Although the cellular module 1321, the Wifi module 1323, the BT module 1325, the GPS module 1327, and the NFC module 1328 share one RF module 1329 shown in FIG. 13, according to an embodiment of the present invention, at least one of the cellular module 1321, the Wifi module 1323, the BT module 1325, the GPS module 1327, and the NFC module 1328 may perform the transmission of an RF signal through an additional RF module.

The SIM card 1324 may be a card including a subscriber identification module and may be inserted into a slot formed at a specific position of an electronic device. The SIM card 1324 may include unique identification information (for example, an integrated circuit card identifier (ICCID)) or subscriber information (for example, an international mobile subscriber identity (IMSI)). According to an embodiment, the SIM card 1325 may be part of the memory device 200. When the SIM card 1324 is inserted into a slot, the AP 1310 may perform an initialization process of the SIM card 1324. During this process, the AP 1310 may determine a sampling point by using the above-mentioned tuning process.

The memory 1330 (for example, the memory 200) may include an internal memory 1332 (for example, the first memory 201) or an external memory 1334 (the second memory 202). The internal memory 1332 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory). According to an embodiment, the internal memory 1332 may be a Solid State Drive (SSD).

The external memory 1334 may further include flash drive, for example, compact flash (CF), secure digital (SD), micro secure digital (Micro-SD), mini secure digital (Mini-SD), extreme digital (xD), or memory stick. The external memory 1334 may be functionally connected to the electronic device 1301 through various interfaces. According to an embodiment, the electronic device 1301 may further include a storage device (or a storage medium) such as a hard drive.

The sensor module 1340 measures physical quantities or detects an operating state of the electronic device 1301, thereby converting the measured or detected information into electrical signals. The sensor module 1340 may include at least one of a gesture sensor 1340A, a gyro sensor 1340B, a pressure sensor 1340C, a magnetic sensor 1340D, an acceleration sensor 1340E, a grip sensor 1340F, a proximity sensor 1340G, a color sensor 1340H (for example, a red, green, blue (RGB) sensor), a bio sensor 1340I, a temperature/humidity sensor 1340J, an illumination sensor 1340K, and an ultra violet (UV) sensor 1340M.

Additionally/alternately, the sensor module 1340 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 1340 may further include a control circuit for controlling at least one sensor therein.

According to various embodiments, the sensor module 1340 may collect operation related sensor signals of the electronic device 1301. The sensor signals collected by the sensor module 1340 may be delivered to the AP 1310. The AP 1310 may analyze the delivered sensor signals to determine that the electronic device 1301 is in a specific operating state, for example, a specific gesture state. When the electronic device 1301 is in a specific gesture state, the AP 1310 may perform a tuning process of the memory device 200. At this point, the AP 1310 may perform at least one process of a delay clock based tuning process, a clock change based tuning process, and a type change based tuning process, in correspondence to a specific setting. According to various embodiments, the AP 1310 may change a setting of a tuning process in correspondence to a gesture operation of the electronic device 1301. For example, upon the receipt of a sensor signal corresponding to a first gesture operation (for example, an operation for shaking a specific number of times by a certain amount), the AP 1310 may change a setting to initialize the memory device 200 through a delay clock based tuning process. Upon the receipt of a sensor signal corresponding to a second gesture operation (for example, an operation for tilting more than a specific angle for a specified time), the AP 1310 may change a setting to initialize the memory device 200 through a type change based tuning process.

The user input device 1350 may include a touch panel 1352, a (digital) pen sensor 1354, a key 1356, or an ultrasonic input device 1358. The input device 1350 may generate an input signal for selecting at least one of types to be applied to a tuning process. The input device 1350 may generate an input signal relating to the initialization of the memory device 200, for example, an input signal relating to an off and on operation of the electronic device. According to an embodiment, the AP 1310 may assign an icon or key generating an input signal relating to the initialization of the memory device 200. According to an embodiment, the AP 1310 may assign an icon or key generating an input signal for selecting at least one of tuning types.

The touch panel 1352 may recognize a touch input through at least one of capacitive, resistive, infrared, or ultrasonic methods, for example. Additionally, the touch panel 1352 may further include a control circuit. In the case of the capacitive method, both direct touch and proximity recognition are possible. The touch panel 1352 may further include a tactile layer. In this case, the touch panel 1352 may provide a tactile response to a user. The touch panel 1352 may generate a touch event relating to tuning process performance. According to an embodiment, the touch panel 1352 may generate a touch event corresponding to an icon selection relating to tuning type selection.

The (digital) pen sensor 1354 may be implemented through a method similar or identical to that of receiving a user's touch input or an additional sheet for recognition. The key 1356 may include a physical button, a touch key, an optical key, or a keypad, for example. The ultrasonic input device 1358, as a device checking data by detecting sound waves through a mike (for example, the mike 1388) in the electronic device 1301, may provide wireless recognition through an input tool generating ultrasonic signals. According to an embodiment, the electronic device 1301 may receive a user input from an external device (for example, a computer or a server) connected to the electronic device 1801 through the communication module 1320.

The display 1360 (for example, the display module 140) may include a panel 1362, a hologram device 1364, or a projector 1366. The panel 1362 may include a liquid-crystal display (LCD) or an active-matrix organic light-emitting diode (AM-OLED). The panel 1362 may be implemented to be flexible, transparent, or wearable, for example. The panel 1362 and the touch panel 1352 may be configured with one module. The hologram 1364 may show three-dimensional images in the air by using the interference of light. The projector 1366 may display an image by projecting light on a screen. The screen, for example, may be placed inside or outside the electronic device 1301. According to an embodiment, the display 1360 may further include a control circuit for controlling the panel 1362, the hologram device 1364, or the projector 1366.

According to various embodiments, the display 1360 may output at least one of information relating to the insertion of the memory device 200, information of the removal of the memory device 200, and information relating to the initialization of the memory device 200. The display 1360 may provide a screen for selecting the type of tuning relating to the sampling point determination of the memory device 200. For example, the display 1360 may output the screens described with reference to FIG. 12.

The interface 1370 may include a high-definition multi-media interface (HDMI) 1372, a universal serial bus (USB) 1374, an optical interface 1376, or a D-subminiature (sub) 1378, for example. The interface 1370 may include the memory interface 170 shown in FIG. 1, for example. Additionally/alternately, the interface 1370 may include a mobile high-definition link (MHL) interface, a secure Digital (SD) card/multi-media card (MMC) interface, or an infrared data association (IrDA) standard interface.

The audio module 1380 may convert sound and electrical signals in both directions. The audio module 1380 may process sound information inputted/outputted through a speaker 1382, a receiver 1384, an earphone 1386, or a mike 1388. According to an embodiment, the audio module 1380 may output audio signals for guiding the insertion and removal process of the memory device 200. The audio module 1380 may output guide sounds relating to the type of a tuning process set in relation to the initialization of the memory device 200. If a tuning process type is changed, the audio module 180 may output guide sound or sound effect relating to the change. An output of the audio signal may be omitted according to a setting.

The camera module 1391, as a device for capturing a still image and a video, may include at least one image sensor (for example, a front sensor or a rear sensor), a lens (not shown), an image signal processor (ISP) (not shown), or a flash (not shown) (for example, an LED or a xenon lamp). Image data collected by the camera module 1391 may be stored in the memory device 200 in response to a control of the AP 1310.

The power management module 1395 may manage the power of the electronic device 1301. For example, the power management module 1395 may control power supply relating to at least one memory management of the memory device 200. The power management module 1395 may cut of power supply relating to corresponding memory management when the memory device 200 is removed. The power management module 1395 may supply power necessary for the initialization process of the electronic device 1301. Although not shown in the drawings, the power management module 1395 may include a power management integrated circuit (PMIC), a charger integrated circuit (IC), or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 1396, or a voltage, current, or temperature of the battery 396 during charging. The battery 1396 may store or generate electricity and may supply power to the electronic device 1301 by using the stored or generated electricity. The battery 1396, for example, may include a rechargeable battery or a solar battery.

The indicator 1397 may display a specific state of the electronic device 1301 or part thereof (for example, the AP 1310), for example, a booting state, a message state, or a charging state. The motor 1398 may convert electrical signals into mechanical vibration. Although not shown in the drawings, the electronic device 1301 may include a processing device (for example, a GPU) for mobile TV support. A processing device for mobile TV support may process media data according to the standards such as digital multimedia broadcasting (DMB), digital video broadcasting (DVB), or media flow.

According to various embodiments, a memory initializing method and an electronic device supporting the same support a stable data sampling point of memory.

According to various embodiments, errors in memory management may occur less frequently according to appropriate memory data sampling point selection and also may support robust characteristic maintenance according to an operating temperature change of an electronic device.

Each of the above-mentioned components of the electronic device according to various embodiments may be configured with at least one component, and the name of a corresponding component may vary according to the type of an electronic device. An electronic device according to an embodiment may be configured including at least one of the above-mentioned components or additional other components. Additionally, some components of an electronic device according to an embodiment are combined and configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. "Module" may be a minimum unit or part of an integrally configured component. "Module" may be a minimum unit performing at least one function or part thereof. "Module" may be implemented mechanically or electronically. For example, "module" used in this disclosure may include at least one of an application-specific integrated circuit (ASIC) chip performing certain operations, field-programmable gate arrays (FPGAs), or a programmable-logic device, all of which are known or to be developed in the future.

According to various embodiments, at least part of a device (for example, modules or functions thereof) or a method (for example, operations) according to this disclosure, for example, as in a form of a programming module, may be implemented using an instruction stored in computer-readable storage media. When at least one processor (for example, the processor 1310) executes an instruction, it may perform a function corresponding to the instruction. The computer-readable storage media may include the memory 200, for example. At least part of a programming module may be implemented (for example, executed) by processor 1310, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using a translator in addition to machine code created by a complier. The hardware device may be configured to operate as at least one software module to perform an operation of this disclosure and vice versa.

A module of a programming module according to various embodiments may include at least one of the above-mentioned components or additional other components. Or, some programming modules may be omitted. Operations performed by a programming module or other components according to various embodiments of the present invention may be executed through a sequential, parallel, repetitive or heuristic method. Additionally, some operations may be executed in a different order or may be omitted. Or, other operations may be added.

The term "include," "comprise," and "have", or "may include," or "may comprise" and "may have" used herein indicates disclosed functions, operations, or existence of elements but does not exclude other functions, operations or elements. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

According to various embodiments, the meaning of the term "or" used herein includes any or all combinations of the words connected by the term "or". For instance, the expression "A or B" may indicate include A, B, or both A and B.

According to various embodiments, the terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For example, a first component may be referred to as a second component and vice versa without departing from the scope of the inventive concept.

In this disclosure, when one part (or element, device, etc.) is referred to as being 'connected' to another part (or element, device, etc.), it should be understood that the former can be 'directly connected' to the latter, or 'electrically connected' to the latter via an intervening part (or element, device, etc.). In contrast, when an element is referred to as being "directly connected" or "directly coupled" to another element, there are no intervening elements present.

Terms used in this specification are used to describe specific embodiments, and are not intended to limit the scope of the present invention. The terms of a singular form may include plural forms unless they have a clearly different meaning in the context.

Unless otherwise defined herein, all the terms used herein, which include technical or scientific terms, may have the same meaning that is generally understood by a person skilled in the art. It will be further understood that terms, which are defined in the dictionary and commonly used, should also be interpreted as is customary in the relevant related art and not in an idealized or overly formal sense unless expressly so defined herein in various embodiments.

Additionally, an electronic device according to an embodiment of the present invention may be a device with memory. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (e.g., head-mounted-devices (HMDs) such as electronic glasses, electronic apparel, electronic bracelets, electronic necklaces, electronic accessories, electronic tattoos, and smart watches).

According to some embodiments, an electronic device may be smart home appliances having memory. The smart home appliances may include at least one of, for example, televisions, digital video disk (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to embodiments, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and stores' point of sales (POS).

According to an embodiment, an electronic device may include at least one of furniture or buildings/structures having memory, electronic boards, electronic signature receiving devices, projectors, or various measuring instruments (for example, water, electricity, gas, or radio signal measuring instruments). An electronic device according to an embodiment may be one of the above-mentioned various devices or a combination thereof. Additionally, an electronic device according to an embodiment may be a flexible device. Furthermore, it is apparent to those skilled in the art that an electronic device according to an embodiment of the present invention is not limited to the above-mentioned devices.

Also, embodiments shown in this specification and drawings are provided as specific examples to describe technical content and help understanding and also do not limit the scope of the present invention. Accordingly, it should be understood that besides the embodiments listed herein, all modifications or modified forms derived based on the technical ideas of the appended claims are included in the scope of the appended claims.

What is claimed is:

1. An electronic device comprising:
   a clock generator configured to generate a clock signal transmitted to a memory device; and
   a host control module configured to:
   transmit, to the memory device, type change information of the memory device and at least one of a changed clock signal with a waveform changed relative to a previous clock signal transmitted to the memory device and a tuning related command;
   receive setting data from the memory device, the received setting data corresponding to at least one of the change clock signal and the tuning related command;
   determine a sampling point by analyzing setting data received from the memory device after the type change information transmission; and
   transmit previous type information to the memory device after the sampling point determination.

2. The electronic device of claim 1, wherein the host control module configured to:
   transmit first type information to the memory device;
   receive a first setting data corresponding to the first type information from the memory device;
   transmit second type information to the memory device; and
   receive a second setting data corresponding to the first type information from the memory device.

3. The electronic device of claim 2, wherein the host control module is configured to:
   determine the sampling point on the basis of the first setting data and the second setting data.

4. The electronic device of claim 1, wherein the host control module is configured to:
   transmit the type change information to the memory device after or before a specific clock period to the memory device.

5. The electronic device of claim 2, wherein the host control module is configured to:
   divide signal section corresponding to one clock period of the first setting data and the second setting data into a specific number of sampling section;
   detect at least one of a valid section and an invalid section from the first setting data and the second setting data; and
   determine a specific point as a sampling point on the basis of the detected section.

6. The electronic device of claim 5, wherein the host control module is configured to:
   detect an invalid section from the first setting data and the second setting data; and
   determine a point spaced a specific time interval away from the invalid section as the sampling point.

7. A memory initializing method comprising:
   transmitting, to a memory device, type change information of the memory device and at least one of a changed clock signal with a waveform changed relative to a previous clock signal transmitted to the memory device and a tuning related command;
   receiving setting data from the memory device, the received setting data corresponding to at least one of the change clock signal and the tuning related command;
   determining a sampling point by analyzing setting data received from the memory device after the type change information transmission; and
   transmitting previous type information to the memory device after the sampling point determination.

8. The method of claim 7, wherein the transmitting of the type change information of the memory device and the receiving setting data comprises:
   transmitting first type information to the memory device and receiving a first setting data corresponding to the first type information from the memory device; and
   transmitting second type information to the memory device and receiving a second setting data corresponding to the first type information from the memory device.

9. The method of claim 8, wherein the determining of the sampling point comprises:
   determining the sampling point on the basis of the first setting data and the second setting data.

10. The method of claim 7, wherein the transmitting the type change information comprises:
    transmitting the type change information to the memory device after or before a specific clock period to the memory device.

11. The method of claim 8, further comprising:
    dividing signal section corresponding to one clock period of the first setting data and the second setting data into a specific number of sampling section;

detecting at least one of a valid section and an invalid section from the first setting data and the second setting data; and wherein the determining of the sampling point comprises determining a specific point as a sampling point on the basis of the detected section.

12. The method of claim 11, wherein the determining of the sampling point comprises:

detecting an invalid section from the first setting data and the second setting data; and determining a time point a specific time interval away from the invalid section as the sampling point.

* * * * *